H. H. CULMER.
HYDROCARBON PRODUCT AND PROCESS OF MAKING SAME.
APPLICATION FILED MAR. 1, 1917.
1,430,538.   Patented Oct. 3, 1922.
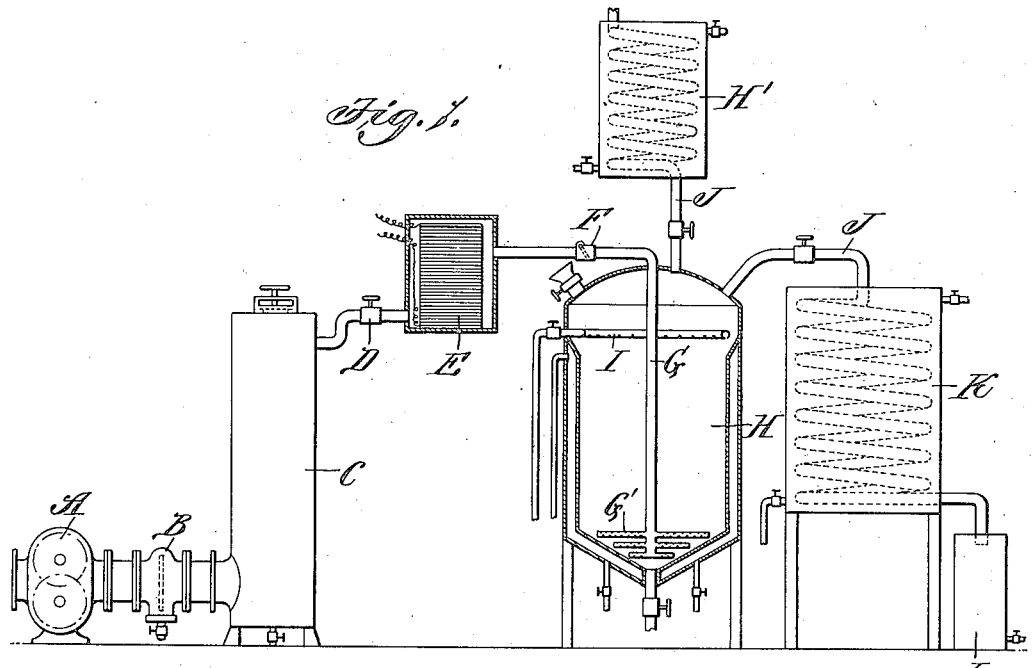
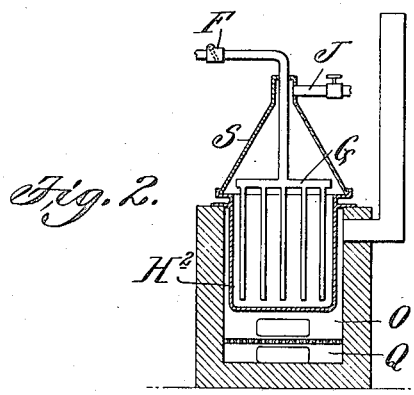
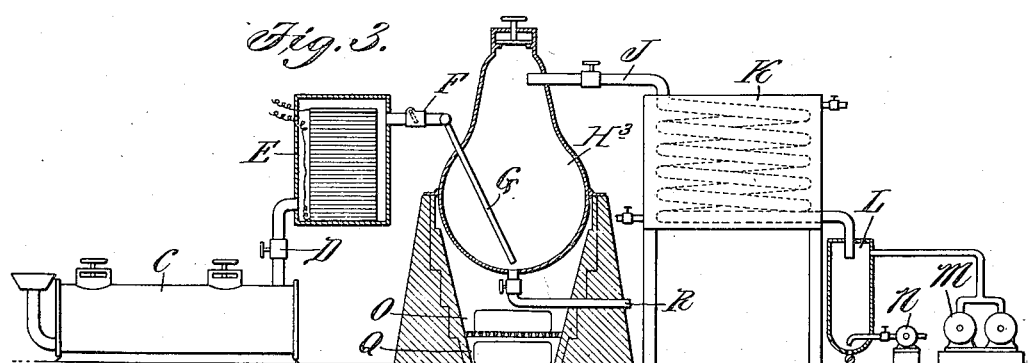

Patented Oct. 3, 1922.

1,430,538

UNITED STATES PATENT OFFICE.

HARRY H. CULMER, OF INDEPENDENCE, KANSAS.

HYDROCARBON PRODUCT AND PROCESS OF MAKING SAME.

Application filed March 1, 1917. Serial No. 151,676.

*To all whom it may concern:*

Be it known that I, HARRY H. CULMER, a citizen of the United States, residing at Independence, Kansas, have invented a certain new and useful Improvement in Hydrocarbon Products and Processes of Making Same, of which the following is a full, clear, and exact description, such as will enable others skilled in the art to which is appertains to make and use the same.

This invention relates to hydrocarbon products and process of making same and has as its salient object to provide a product made principally from an olefin hydrocarbon which product is itself of an elastic rubbery character and vulcanizable to produce a rubber substitute; preferably the product contains a minor percentage of tirpene hydrocarbon such as those obtained from pine or wood tars. The invention also relates to a novel process for producing the above product.

To this end I have devised a process which, briefly stated, consists in treating hydrocarbons with ozone, ozonized air or an ozonized gaseous mixture for the purpose of incorporating oxygen in same, said process being applicable to the treatment of hydrocarbons derived from the animal, vegetable and mineral kingdoms, such, for example, as from petroleum, coal, coal tars, animal and fish fats, oils and vegetable gums, oils and latexes and also those derived from fossil gums, bitumens, as well as those derived from vegetable tars and oil or from the products obtained in the distillation of wood. In view of the fact that it is immaterial, so far as my broad idea is concerned, whether the ozone is diluted by air or other gases, I have used the term "ozone" in the claims to mean ($O_3$), ozonized air or ozonized gaseous mixtures.

It is known that air under normal atmospheric conditions of pressure weighs .080728 pound per cubic foot at 32° F. The amount of oxygen to a cubic foot of air is one-fifth, or 0.016 pound of oxygen. The amount of oxygen in the air as it is when used may not be available and seldom is available or all used in reactions where such air is used as an oxidizing agent because the oxygen ($O_2$) is in a state of equilibrium and passes through the substance being treated along with the other air gases without reacting at all. Heretofore oxidation of hydrocarbon bodies has been accomplished by the use of acids, heat or air. The acids used are generally either nitric, sulphuric, bromic, chloric, etc., and in many cases it is impossible to remove the acids used. If an attempt is made to remove the acids it necessitates long and tedious treatment,—generally washing and alkaline neutralization, which is both expensive and time-consuming, and in some cases, dangerous, because of nitric or nitration products being formed. Heretofore, oils and liquid hydrocarbons treated by air blowing have consumed considerable time and necessitated high heats being used to enable them to be partially oxidized by air oxygen ($O_2$) the oxygen in some cases burning hydrogen into water from the oil, and in others, resulting in slight fixation of oxygen. In either case the oxidation is incomplete, vast amounts of air are used to try to obtain their results and a long period of time is consumed in effecting a physical change.

I have discovered that if the oxygen is made active by being converted into ozone, it is possible to use all the available 0.016 pound of oxygen per cubic foot of the air, and thereby not only cut down on the amount of air needed to produce any given reaction, but also produce reactions with the ozonized gaseous mixtures that are not possible with ordinary air or oxygen that is not in an ozone state. If air or oxygen is treated with electricity before it enters the sphere of reaction, the oxygen is converted into ($O_3$) that will be in the best form to produce quick results and changes in chemical reaction and the oxidation be completed in a shorter time than with ordinary oxygen. I have also learned that when ozone or ozonized air or other ozonized gaseous mixtures are used to oxidize hydrocarbons it is possible to maintain a lower reacting temperature than is possible with ordinary oxygen; also that even though the reaction is exothermic or heat-giving, that by cooling I can keep the reacting temperature down to a lower point than with ordinary air or oxygen. This is of advantage because hydrocarbons, their salts and acids, have a tendency to burn at high temperature, or to split up, distil or sublime if too great a temperature is used.

In contradistinction to the prior use of oxygen, I find that ozone ($O_3$) not only effects a physical change with some hydrocarbons, but actually forms oxidized bodies, and in this way, acts similar to an acid. I find this of great advantage in the formation of certain dye stuffs from coal tar oils, in the removal of sulphur from petroleum; and in the coagulation of certain vegetable latex. I also find it of advantage, in the treatment of certain vegetable oils, fats and resin, in the formation of elastic vulcanizable bodies, in this:—that acids, while accomplishing a similar result, are, because of their watery nature, held intrained or emulsified, and such a combination of acids is extremely difficult of cleansing and separation; in fact, some of these acids can only be separated from the hydrocarbons treated by fusion with an alkali—the mere neutralization by a watery solution of the alkali not being sufficient to effect the elimination of the acid from the hydrocarbon or mixture. It is also apparent that by my process certain direct oxidation reactions can be made at temperatures above those where watery acids begin to concentrate by loss of water, and where undue foaming would take place.

Another advantage that results from the use of ozone, ozonized air or ozonized oxygen, as an oxidizing agent for hydrocarbon, is that the oxidation can be completed at low temperatures. This is advantageous in some instances, as for example, where low boiling liquids such as benzole, gasolene and the like are to be cleaned or transformed into certain chemical combinations; where hydrocarbons are to be treated while in solution in such low boiling liquids or are to be changed by the use of an oxidizing reaction; and where the oxidation is the vehicle for chemical change and recombination. This is apparent in such reactions as the transformation of pinene into butyric acid. Also in the oxidation of pinene in water to pinene glycol, this being simply an example of a number of reactions too numerous to set forth in detail. Many hydrocarbons of the camphor group can be oxidized by my process to advantage.

Among the salient objects of this invention is that of producing a synthetic rubber having the faculties of being vulcanized, the same as tree rubber, and also the formation of solid colloidal solutions of elevated flow point above the melting or flow point of the material treated. I have also produced, by slight modification, artificial resins from vegetable oils, artificial asphalts from petroleum, and also vulcanizable bodies from mixtures of coal and wood tar, wood tar and petroleum. I wish it to be understood that the temperatures specified apply only to the particular kinds of hydrocarbons being treated, and furthermore, that the temperatures of reaction vary over wide limits, in some cases being carried out at freezing, with others at ordinary temperatures of atmosphere; and with others at elevated temperatures, sometimes below, and sometimes above the boiling point of the hydrocarbon material being treated. It is believed, however, that the rules herein set forth as a guide to control the reaction in all cases form a means of control that will enable those versed in such matters to recognize the progress of the reaction and control by proper sampling the duration of the process and obtain the desired results.

Figure 1 of the drawings is a view, partly in vertical section and in side elevation, of an apparatus that can be used for practicing my invention in the treatment of hydrocarbon material in the form of a hydrocarbon salt.

Figure 2 is a vertical sectional view, illustrating a slight modification that can be made in the apparatus shown in Figure 1; and Figure 3 is a view, partly in vertical section and in side elevation, of an apparatus in which hydrocarbons high in olefin can be treated, in accordance with my invention.

When my process is used in the treatment of a hydrocarbon in the form of a hydrocarbon salt, namely, a crystalline hydrocarbon dissolved in a liquid, I put into the apparatus shown in Figure 1 a strong solution of the purified coal tar product anthracene and glacial acetic acid. Taking one hundred pounds of this anthracene and dissolving it in twelve hundred pounds of glacial acetic acid, I put this solution into a steam-heated, unglazed earthenware receptacle H provided with a reflux condenser H' and raised to the temperature near the boiling point of the glacial acetic acid. When this temperature is reached and all the anthracene is in solution, I then start the blower A, causing a current of air to be compressed to about five or six pounds pressure, which compressed air flows through the moisture drip B, where any condensable moisture drops out through the drip and the air passes on through the calcium chloride drier C and out through the valve D and into the ozonizer E, where it is subjected to silent discharge of electricity and converted into ozone. The ozone then passes out of the ozonizer through a check valve F down through the distributing pipes G and G', where it comes in contact with the solution of anthracene and acetic acid in the receptacle H and percolates up through the solution.

Another mode of bringing the ozone and the solution together is to pump the solution through a perforated pipe I and let it fall in drops through an atmosphere of ozonized air in the same receptacle but having less of the solution in contact at one time. Similar results can be obtained by circulating the solution a number of times in heated condition by means of a pump. This ozonizing action is allowed to continue until a sample of the solution, when poured into water, precipitated, washed and dried, and analyzed, is found to contain no anthracene but the hydrocarbon salt is all converted into anthraquinone. When the action is complete this is run into an excess of cold distilled water when the anthraquinone separates out as a paste and is filtered from the watery acid, which is again concentrated, crystallized and used over. The anthraquinone is washed with water, dilute alkali, and again with water, until free from alkali, and is further treated in the usual manner for making dyes. This example is illustrative of a number of like reactions with many hydrocarbon salts.

When the process is used in the formation of elastic vulcanizable bodies produced from hydrocarbon residues of an oily nature, one ton of the residue from the distillation of pine or Stockholm tar and three tons of the olefin residue obtained from the distillation of glycerine are put into a heated container $H^2$ of the kind shown in Figure 2, said heated container $H^2$ being used in place of the container H previously described that forms part of the apparatus shown in Figure 1. Air is then compressed in the compressor A to twenty-five or fifty pounds pressure, which compressed air flows through the moisture drip B, calcium chloride drier C and valve D into the ozonizer E, where it is subjected to silent discharges of electricity and converted into an ozonized mixture or air gases and ozone. Said mixture then passes through the check valve F and distributing pipes G extending down through the liquid hydrocarbons in the container $H^2$ to within a few inches of the bottom of the container which consists of a kettle placed over the fire box O and ash pit Q.

This ozone is allowed to percolate through the liquid hydrocarbons and agitate same, bringing into intimate contact the ozone with all parts of the liquid hydrocarbon in the kettle $H^2$. The spent gases, together with some reek of oily hydrocarbons, the nature of which at this time I do not understand, pass out through the exhaust pipe J and into the condenser K. These products that are carried over are conveniently caught in the receiver L and are further purified. In some instances they can be used for flotation oils, and in some instances for lubrication oils. The mass in the kettle $H^2$ is churned by the incoming ozone and gradually thickens until it assumes a viscous liquid somewhat elastic, and at this period the temperature must be raised to make it fluid enough to continue the treatment. The mass, after some three or four hours, assumes a jelly-like appearance, but the treatment is continued until the mass is uniformly semi-solid or solid on the removal of a sample. When the mass is finished, a sample will exhibit a rubber-like appearance and consistency and have an elevated flow or melting point, so that it will not flow out of the kettle $H^2$ from an orifice, but can be dumped out onto a cooling floor by use of a crane to pick up the kettle. Care should be taken not to overheat the mass after it congeals, because at approximately 500° F. some of the hydrocarbons burn or scorch and in this form do not make a perfect product. The advantage of using ozone in treatment of these liquid hydrocarbons is, I find, that certain olefin hydrocarbons which are found in many vegetable, as well as animal oils, and certain terpene hydrocarbon $C_{10}$ and $H_{16}$ groups, when brought together under an ozonizing action, polymerize together, forming other hydrocarbons than those originally present and take on the form of higher terpene hydrocarbons. The olefin hydrocarbons enter into the molecule as additional products, probably due to some dehydration, and take on the form of olefinic-polyterpenes, which newly formed hydrocarbon bodies exhibit the characteristics of uniting with such elements as bromine, chlorine and sulphur to form vulcanized bodies resembling vulcanized rubber.

In Figure 3 of the drawings I have illustrated another form of apparatus that can be used in practicing my process. One way of using said apparatus is to take four tons of kauri gum, gilsonite or natural asphaltum or other suitable hydrocarbon gummy substance and dissolve the gum or gummy substance by means of heat in six tons of olefin hydrocarbon residue obtained from the distillation of lignite coal or cannel coal or from the distillation of a petroleum or shale oil high in olefin hydrocarbons and place these hydrocarbons in the receptacle $H^3$ of the apparatus shown in Figure 3. As my broad idea is not limited to the use of gummy substances of the character just referred to, I have used the term "hydrocarbon gummy substances" in the claims to mean any suitable gummy hydrocarbon substance or hydrocarbon gum. The vacuum pump M is then started, so as to draw air into the apparatus through the calcium chloride drier C and into the ozonizer E, where it is subjected to silent discharges of electricity and changed into an ozonized gaseous mixture, which, in turn, is drawn into the ozonizing agitator $H^3$ through a plurality of distributing pipes G that run to within a few inches of the bottom of the mass which is held in a heated state above the melting point of the mass treated. This incoming ozone agitates and churns the mass and comes in intimate contact with all of the melted hydrocarbons. Instead of using a vacuum pump to draw the ozone into the agitator H³, pressure could be used to force the ozone into the agitator. This ozonizing treatment is continued at a temperature above the melting point, but under the flash and fire points of the mass treated. If the temperature is allowed to rise above the flash point, an explosion will ensue. I have found that the temperature rises quite rapidly even without fire, due to the rapid change or uniting of oxygen with the olefin hydrocarbons. This oxidized olefin hydrocarbon, when in contact with certain terpene hydrocarbons, causes them to unit or polymerize together, forming a third substance, the chemical nature of which at this time I have not fully determined, but presume to be of the terpene group, because of their elasticity. The physical attributes of the newly formed elastic body or bodies being formed is, that the melting or flow point is raised as the process continues, and if a sample is withdrawn from time to time, the mass will be found to be gradually approaching the qualities on cooling of the mineral elaterite. The process is continued as long as an elevation of the flow point is accomplished, and the substance treated remains still soluble in the ordinary rubber solvents. When the mass has a melting point of 400° to 420° F. and a consistency of a hard rubber-like body on cooling it is withdrawn through the drawoff or the kettle dumped, as the case may be, into proper receptacles for cooling and shipping.

However, if the process is pushed on at an elevated temperature, I find a non-melting, insoluble substance is produced having the characteristics of the mineral wurtzilite that burns before it melts, and in this form is of little or no use for mixing with rubber, because it is not possible to get a homogeneous mixture with sulphur for vulcanizing. These hydrocarbons, after treatment with ozone, exhibit the qualities of not being acted upon by acids or alkalis, or by ordinary air oxygen, and have great strength in the rubber compound after vulcanizing and impart to tree rubber and reclaimed rubber an increased toughness, and render tree rubber, when admixed therewith, less susceptible to weather and disintegration, thereby lengthening its life. These latter attributes are not common to other rubber substitutes, and therefore, hydrocarbon substances produced as above are susceptible to a wide range of use in the rubber industry.

From the foregoing it will be seen that by my process I accomplish, in a cheap and effectual manner, results which heretofore could be obtained only by the use of expensive salts, such as potassium permanganate.

For example—geraniol can be readily decomposed into acetone and oxalic acid by my process by simply blowing a watery solution of geraniol with ozone for a few minutes. Certain terpenes derived from wood, garbage, etc., can be coagulated into rubbery masses by blowing with ozone in an apparatus of the kind herein described. Also the latex or milk of such plants as the milkweed, osage hedge, etc., can be changed by ozone into rubber-like masses. Certain refuse of the oleic acid industry, the nature of which I do not know at this time, but presume to be certain fatty acids, among which are linoleic and oleic acids, are capable of being ozonized at low temperatures and formed into viscous oxidized bodies capable of vulcanization. This is of advantage, because the reaction can take place at temperatures where animal fats, fatty oils and refuse of the character mentioned do not break up, and form bodies that are burned, or that are not capable of being worked to advantage. For example, if lard is raised to a temperature to which it is scorched or burned, it is spoiled forever and cannot be sweetened, whereas, if it is treated at a lower temperature, such as the ordinary cooking temperatures, it is easily sweetened by boiling with a potato. In a similar way, if I treat such hydrocarbon bodies below the burning or disintegrating points, these fatty acids or fats can be converted into elastic bodies capable of vulcanization, whereas, if they are blown at elevated temperatures, they break up into products of destructive distillation and substances insoluble in the ordinary rubber solvents.

These elastic vulcanizable bodies can be formed by blowing or agitation with ozone from mixtures of tars derived from the destructive distillation of wood and destructive distillation of coal or mixtures of both. They can also be formed by the ozonization of certain asphalts, such as gilsonite, together with oleic acid and wood tar, and when ozonized to proper consistency, are capable of being rolled into sheets mixed with sulphur and vulcanized in the ordinary manner. Products treated as above described are better adapted for use in the rubber industry than those made by the use of ordinary air oxygen, because the ozone in its state converts certain oily hydrocarbon bodies within the mass into colloidal solid solution with part of the oxygen in the molecule which is displaced in vulcanization by the sulphur, thereby forming a resultant substance having the characteristic of vulcanized rubber. This result is not obtained by the use of air alone, or oxygen in its ordinary state, because the oxygen present in ordinary form is not capable of effecting the result, and the oily bodies remain in the mass unconverted, and in this unconverted form they have the property, as is well known, of rotting and deteriorating rubber when mixtures therewith are attempted. Therefore, synthetical rubbers produced by ozonization are better fitted and capable of entering a larger field than the ordinary rubber substitutes. The snythetical rubbers also possess the characteristic of entering into the rubber molecule when mixed therewith. Another novel and new feature of my invention is that certain fossil gums, such as gilsonite, are capable of being transformed at a temperature slightly above their flow or melting point or at their liquid point into the mineral or substance resembling the mineral elaterite, showing conclusively a different reaction than anything heretofore known, and opening up in this connection a number of newly formed bodies valuable to the rubber and other industries. These substances, when ozonized to their limit, show the characteristic of the mineral elaterite, as well as that of certain highly vulcanized rubbers, of burning before they melt. They are capable, however, of being worked in plastic form and vulcanized from sulphur, if the ozonization is not pushed to the limit. I have also found that certain combinations of these fossil gums such as gilsonite, asphalt, amber, kauri gum, are likewise in mixtures with certain tars, oils and solvents capable of ozonization, and manufacturing thereby rubber substitutes having a large field of use.

Having thus described my invention, what I claim, and desire to secure by Letters Patent is:

1. A product of the character described consisting of a solid or semi-solid elastic body, the essential portion of which is ozonized olefin hydrocarbon oil, said body being capable of vulcanization.

2. A solid or semi-solid body consisting essentially of ozonized olefin hydrocarbons and a portion of ozonized terpene hydrocarbons, said product being elastic in character and capable of vulcanization into a rubberite compound.

3. A process of producing vulcanizable bodies, consisting in bringing ozone into intimate contact with olefin hydrocarbons in the presence of heat regulated to avoid material distillation and continuing the process until the hydrocarbons have been converted into solid or semi-solid bodies of elastic character and capable of vulcanization.

4. A process of producing vulcanizable bodies consisting in bringing ozone into intimate contact with a mixture of olefin and terpene hydrocarbons in the presence of heat regulated to avoid material distillation and continuing the process until such hydrocarbons have been converted into solid or semi-solid elastic bodies capable of vulcanization.

5. A vulcanizable semi-solid elastic body consisting of ozonized olefin hydrocarbons.

6. A vulcanizable semi-solid elastic body consisting of an ozonized mixture of olefin and terpene hydrocarbons.

HARRY H. CULMER.